United States Patent Office 3,062,686
Patented Nov. 6, 1962

3,062,686
PROCESS OF TREATING TEXTILE WITH A COPOLYMER AND A CROSS-LINKING AGENT
Wilhelm Graulich, Wolfgang Lehmann, and Otto Bayer, Leverkusen-Bayerwerk, and Wilhelm Kass and Wilhelm Berlenbach, Koln-Stammheim, Germany, assignors to Farbenfabriken Bayer Aktiengesellschaft, Leverkusen, Germany, a corporation of Germany
No Drawing. Filed Apr. 17, 1956, Ser. No. 578,571
Claims priority, application Germany Apr. 30, 1955
7 Claims. (Cl. 117—161)

This invention relates to a process of printing or padding textiles by the pigment printing or padding process.

It is known to print or finish textiles with pigment-containing solutions of basic polymers or emulsions of polymers. The combination of these two binding agents is also known. It is an advantage in this connection to carry out the process in the presence of compounds which enable the basic polymers to be cross-linked. When using with this combination latices with reactive groups which react with the basic polymers there may also be brought about a cross-linking of the latices.

According to the invention pigment printings having special fastness properties may be obtained by using these latices with reactive groups in the presence of such basic polymers which not only cross-link with the latices but easily become insoluble of themselves. Prints produced in this way distinguish themselves by a practically complete resistance to abrasion, especially high brilliancy, excellent fastness to washing and extremely soft handle, i.e. fastness properties which could not be obtained up to now by the known pigment printing processes. Printing pastes of this kind are moreover highly insensitive to the addition of acids, oxidizing or reducing agents. The process which in this way becomes applicable in a great number of purposes may be carried out, if desired, with any thickening agents, preferably with a benzine-thickener emulsion.

Copolymers suitable for carrying out the process according to the invention may be obtained by polymerizing polymerizable monomers which contain reactive groups with other polymerizable compounds.

As monomers with reactive groups there are especially suitable monomers which contain a carbonyl group such as aldehyde groups, keto groups, further carboxyl and/or carbonamide groups which carry at least a hydrogen atom on the nitrogen. Suitable monomers are, for example, acrylic acid, methacrylic acid, semi-esters of maleic or fumaric acid, acrylamide, methacrylamide, acrylic acid monobutylamide, or methyl-acrolein.

As monomers which may be copolymerized with the aforesaid monomers containing reactive groups there may be mentioned, for example, the di-olefins with conjugated double bonds, such as butadiene, isoprene, di-methyl-butadiene, chloroprene, other monomers having two double bonds such as glycol diacrylates, acrylic acid allyl esters, vinyl or vinylidene compounds such as styrene, acrylic acid or methacrylic acid derivatives, vinyl chloride, vinyl acetate, vinyl butyrate, vinylidene chloride, vinyl ether, maleic acid or fumaric acid di-esters and furthermore the substitution products or homologues of the aforesaid products.

The monomers are chosen from the aforesaid groups according to the desired properties. Thus, prints may be obtained having an especially pleasant handle by using a high proportion of butadiene or of the acrylic acid esters or of the vinyl ethers of higher alcohols. The proportion of the monomers with reactive groups in the polymer determines the degree of the cross-linking ability. Since too high a cross-linking leads in general to brittleness of the film thus formed the amount of monomers in the polymer will have to be comparatively small, i.e. about 0.5 to 0.25 percent of the starting monomers.

The components of the copolymers of the latices may advantageously be selected so that the aqueous emulsions with very small amounts of polymers dissolved in water, particularly with the above mentioned basic polymer, yield extremely high increases in the viscosity. The corresponding printing pastes then require only comparatively small amounts of benzine with which to be emulsified and no further thickener in order to be printable, that is to say they are sufficiently viscous and ductile. Since in the printing pastes there are substantially only used as binder and thickeners compounds which yield a water-insoluble and abrasion-resistant film, prints are obtained having a very surprising soft handle and excellent fastness to abrasion and washing.

The basic self-cross-linking polymers are, for example, condensation products of di- or poly-amines and epichlorohydrin, dichlorohydrin, halogen fatty acid esters or di- or poly-oxide compounds or mixtures thereof. As di- or poly-amines there may be used, for example, propylene-diamine, tetramethylene-diamine, hexamethylene-diamine, γ,γ' - diaminopropyl - methyl-amine, γ,γ' - diaminopropyl ether, dipropylene-triamine, diaminopropyl-ethylene-di-amine, diaminopropyl-tetramethylene-diamine (spermine), diamino-propyl - hexamethylene - diamine, bis-(γ-aminopropyl)-piperazine, N-(1.6-hexane-diamine)-3-pyrrolidone

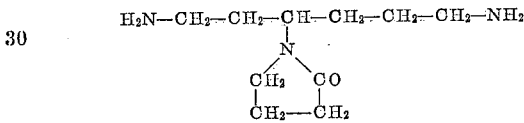

or polyethylene-diamine.

The production of these products is described in co-pending patent application Ser. No. 384,514, filed October 6, 1953, by Wolfgang Lehmann, Ferdinand Münz, Otto Bayer and Helmut Kleiner, which application is assigned to the same assignee as the present case, now Patent No. 2,844,490. The reaction of the di- or polyamines with epichlorohydrin, dichlorohydrin and the like, or with halogen esters has to be carried out in such amounts and under such conditions that not all hydrogen atoms are replaced on the nitrogen so that after printing or padding a further cross-linking with itself or with the latices is ensured.

By suitably selecting the molar ratio, the pH-value, the concentration, temperature and reaction time it is possible to produce products of most varied viscosity. The condensation reactions may be interrupted at any time by the addition of acid, which involves at the same time a stabilisation of the condensation products. The condensation products react with self-cross-linking upon heating to temperatures of about 100° C. because of their content of epoxy groups, $CH_2Cl$ or ester groups, as well as NH— and/or $NH_2$— groups, water insoluble products being formed. In the presence of latices with reactive groups which are capable of reacting with epoxide, $CH_2Cl$—, ester groups or with amines carrying hydrogen atoms, a cross-linking with the latices may occur upon heating, apart from a reaction of the basic polymers with one another.

The employment of such latex-cross-linking agents which may act at the same time as pigment binders has the advantage over most cross-linking agents that they may be used in excess on account of their self-cross-linking ability.

When an excess of the customary water-soluble cross-linking agents, non-volatile at 100–150° C. on drying, is used they remain partially unchanged in the film after fixation and thus cause a reduced resistance to water.

Despite these disadvantages, a small excess is preferably employed in practice since even a small deficiency of cross-linking agents would be less satisfactory still.

It is also possible to apply additionally further high or low molecular weight substances which themselves do not show any self-cross-linking power but become insoluble with either the latices or the basic self-cross-linking high molecular weight compounds such as triacrylformal, polyacrylamide, polyvinyl alcohol, polyvinyl acetate, and basic non-cross-linking polymers.

The following examples are given for the purpose of illustrating the invention, the parts being parts by weight.

Example 1

A cotton fabric is printed with the following printing paste: To 50 parts of a 30 percent pigment paste are added 150 parts of a 40 percent copolymer emulsion from 30 parts of butadiene, 30 parts of styrene, 36 parts of butylacrylate and 4 parts of methacrylic acid. Then, there are added 550 parts of a 70 percent benzine-in-water emulsion
165 parts of water
20 parts of glycol
30 parts of urea and
35 parts of a 30 percent aqueous solution (300 centipoises at 25° C.) of the hydrochloride of a basic polymer formed from 0.3 mol dipropylene-triamine and 1.0 mol of epichlorohydrin ---
1000 parts The printed fabric is dried and subsequently heated to 140° C. for five minutes. A print is obtained having excellent fastness properties.

Example 2

50 parts of a 20 percent aqueous pigment dyestuff paste and
200 parts of a 40 percent latex from 40 percent of dichloroethene, 40 percent of butylacrylate, 16 parts of styrene and 4 parts of methacrylic acid
25 parts of a 10 percent aqueous solution of the conversion product of cetyl alcohol with ethylene oxide are slowly emulsified in
650 parts of benzine. To this emulsion there are added
45 parts of water and
30 parts of a 30 percent aqueous solution of the hydrochloride of a basic polymer formed from 0.76 mol dipropylene-triamine and 1.00 mol of chloracetic acid ethyl ester and having a viscosity of 650 centipoises ---
1000 parts If cotton or staple fibre fabrics are printed with this printing paste there are obtained good fastness properties after fixation by steaming or condensation.

Example 3

600 parts of an emulsion of 70 percent of benzine, 29 percent of water and 1 percent of a 10 percent aqueous solution of polyacrylic acid oxethyl ester are mixed with
150 parts of a latex as described in Example 1. Into this mixture are stirred
100 parts of a 15 percent aqueous pigment paste and added to
20 parts of a 40 percent solution of the hydrochloride of a basic epoxide polymer produced from 0.28 mol γ,γ'-diamino-propyl-methyl-amine and 1.0 mol epichlorohydrin. The mixture is then made up with
50 parts of urea and
80 parts of water to ---
1000 parts The preceding mixture yields a well stable ductile printing paste which may be easily rinsed off with water from the printing rollers and film printing screens. The printing paste is printed in usual manner on cotton, staple fibre, Perlon or nylon. For the after-treatment the print is preliminarily dried in a drying chamber at 40–70° C. and then heated at 100–150° C.

Instead of heating the print may also be treated with neutral or acid steam or be passed through an alkaline bath containing 2–3 grams of sodium hydroxide 38° Bé. at 50–80° C. The prints obtained on cotton, staple fibre, Perlon or nylon distinguish themselves by an extremely soft handle, depth of colour, brightness, good fastness to dry rubbing and very good fastness to wet rubbing, very good fastness to rubbing by hand, very good fastness to boiling soda and light.

Example 4

200 parts of a 40 percent copolymer emulsion from 30 parts of butadiene, 30 parts of styrene, 30 parts of acrylic acid butyl ester and 10 parts of methacrylamide are mixed with
300 parts of a 6 percent solution of methyl-cellulose
300 parts of water
50 parts of urea
50 parts of an aqueous 20 percent pigment dispersion
50 parts of glycerol and
50 parts of a 20 percent solution (100 centipoises at 25° C.) of the hydrochloride of a polymer formed from 1.0 mol dipropylene-triamine, 1.65 mols epichlorohydrin and 0.65 mol of chloracetic acid ethyl ester ---
1000 parts The prints obtained on cotton, staple fibre and rayon distinguish themselves by depth of colour, brilliancy as well as by very good fastness to dry and wet rubbing and very good fastness to rubbing by hand.

Example 5

600 parts of an emulsion from 70 percent of benzine, 29 percent of water and 1 percent of a 10 percent aqueous solution of polyacrylic acid oxethyl ester are mixed with
150 parts of a latex as described in Example 1. Into this mixture are stirred
100 parts of a 15 percent aqueous pigment paste and added to
20 parts of a 40 percent solution of the hydrochloride acetate of a basic polymer formed from 0.5 mol diamino-propylhexamethylene-diamine and 1.0 mol chloracetic acid ester. (Acetic acid is added for stabilizing the polymer.) The mixture is then made up with
50 parts of urea and
80 parts of water to ---
1000 parts The fabric printed with this printing paste is dried and subsequently heated to 130–150° C. for five minutes. A print is obtained having excellent fastness properties.

Example 6

140 parts of a copolymer as described in Example 4 are mixed with
600 parts of a 70 percent benzine-in-water emulsion. Into this mixture there are stirred
100 parts of a 15 percent pigment paste and the whole added to
20 parts of a 40 percent solution of the hydrochloride of a basic epoxide polymer (300 centipoises at 25° C.) produced from 0.3 mol dipropylene-triamine and 1.0 mol epichlorohydrin 10 parts of a 10 percent aqueous solution of the acetate of a conversion product from a polyacrylic acid butyl-ester of K-value 53 and methyl-propylene-diamine
5 parts of triacrylformal
50 parts of urea and made up with
75 parts of water to
_____
1000 parts The fabric printed with this printing paste is dried and subsequently heated to 130–150° C. for five minutes. A print is obtained having excellent fastness properties.

We claim:
1. A process of treating a textile which comprises applying to said textile a mixture of
   (1) a basic self-cross-linking high molecular weight compound formed by the condensation of a polyamine with a member selected from the group consisting of epihalohydrins, dihalohydrins and chloro lower fatty acid lower alkyl esters;
   (2) an emulsion of a copolymer prepared by copolymerizing
      (a) a monomer with a reactive group, said monomer being selected from the group consisting of acrylic acid, methacrylic acid, semiesters of maleic acid, semiesters of fumaric acid, acrylamide, methacrylamide, acrylic acid monobutylamide and methyl-acrolein, and
      (b) a monomer selected from the group consisting of butadiene, isoprene, di-methylbutadiene, chloroprene, glycol diacrylates, acrylic acid allyl ester, butylacrylate, styrene, vinyl chloride, vinyl acetate, vinyl butyrate, vinylidene chloride, vinyl ethers, maleic acid diesters, fumaric acid diesters; and
   (3) then effecting cross-linking of the mixture on the treated textile.
2. A process of claim 1 wherein the reactive group of the monomer with a reactive group is carboxyl.
3. A process of claim 1 wherein the monomer with a reactive group is methacrylic acid.
4. A process of claim 1 wherein the reactive group of the monomer with a reactive group is acrylic acid.
5. A process as claimed in claim 1 wherein the copolymer consists of butadiene, styrene, butylacrylate and methacrylic acid.
6. A process as claimed in claim 1 wherein the copolymer consists of dichloroethene, butylacrylate and methacrylic acid.
7. A process as claimed in claim 1 wherein the copolymer consists of butadiene, styrene, acrylic acid butyl ester and methacryl-amide.

References Cited in the file of this patent
UNITED STATES PATENTS

| | | |
|---|---|---|
| 2,136,928 | Schlack | Nov. 15, 1938 |
| 2,431,745 | Flanagan | Dec. 2, 1947 |
| 2,469,407 | Powers et al. | May 10, 1949 |
| 2,611,719 | Borders et al. | Sept. 23, 1952 |
| 2,654,680 | Goppel et al. | Oct. 6, 1953 |
| 2,744,035 | Fierstein et al. | May 1, 1956 |
| 2,780,562 | Reinartz et al. | Feb. 5, 1957 |
| 2,844,490 | Lehmann et al. | July 22, 1958 |
| 2,897,101 | Graulich | July 28, 1959 |
| 2,933,416 | Haakh et al. | Apr. 19, 1960 |